United States Patent [19]
Fackler

[11] 4,415,041
[45] Nov. 15, 1983

[54] MINIMUM TILL ROTARY HOE
[75] Inventor: Charles K. Fackler, Gibson City, Ill.
[73] Assignee: M & W Gear Company, Gibson City, Ill.
[21] Appl. No.: 321,114
[22] Filed: Nov. 13, 1981
[51] Int. Cl.³ ............................................. A01B 39/08
[52] U.S. Cl. .................................... 172/551; 172/573
[58] Field of Search ............... 172/572, 573, 551, 500, 172/556, 774, 56

[56] References Cited
U.S. PATENT DOCUMENTS

| 2,839,980 | 6/1958 | Evans | 172/556 X |
| 3,608,646 | 9/1971 | Ryan | 172/572 |
| 3,734,201 | 5/1973 | Zaun | 172/572 |
| 3,967,685 | 7/1976 | Siekmeir | 172/551 |
| 4,194,575 | 3/1980 | Whalen | 172/573 |

Primary Examiner—Richard J. Johnson
Attorney, Agent, or Firm—Allegretti, Newitt, Witcoff & McAndrews, Ltd.

[57] ABSTRACT

A minimum tillage rotary hoe includes a tool bar mounted transverse to the direction of field travel. Projecting rearwardly from the tool bar are a plurality of rotary hoe support arms each having a single, uniform diameter, multi-tined rotary hoe affixed to the end thereof. The rotary hoe members are staggered to define a forward row and a rear row of hoe members, each row defining generally a separate, single axis of rotation. The axes of the rows are separated by a distance less than the diameter of the rotary hoes but greater than about 0.8 the diameter of the rotary hoes. Separation is considered critical in order to render the hoes self-cleaning. Self-cleaning of field trash is effected by movement of adjacent hoes and more particularly the tines of adjacent hoes past one another to clean out the trash.

1 Claim, 5 Drawing Figures

MINIMUM TILL ROTARY HOE

BACKGROUND OF THE INVENTION

This invention relates to an improved rotary hoe implement comprised of a plurality of multiple tined, equal radial, rotary hoe members mounted on a tool bar.

Heretofore there have been available minimum tillage rotary hoe farm implements comprised of a tool bar mounted transverse to the direction of field travel with a plurality of rotary hoe members attached to the tool bar for tilling the soil as the implement is drawn by a prime mover such as a tractor. The construction believed to be most closely related to the present invention is an apparatus as depicted in FIG. 1 which is made and sold by applicant. That apparatus includes a transverse tool bar from which a plurality of rotary hoe support arms project rearwardly. Each of the arms is spring biased downwardly toward the soil and a single rotary hoe is attached to the end of each arm. Each rotary hoe is fabricated from a plurality of radially extending tines which are pointed for penetration of the earth or soil as they are drawn through a field. The tines thus form a rotary shaped hoe having an appearance similar to the spokes of a wheel. Each of the hoes attached to the tool bar has a substantially equal radius. The hoes are mounted to define two overlapping alternating rows of rotary hoes. The offset of the center of these overlapping rows is approximately 7½ inches which is less than the radius of the rotary hoes. Additionally, each rotary hoe is mounted on an arm which extends in the direction of field travel and includes a axle projected at right angles from the arm for mounting of the rotary hoe. The arm is thus generally L-shaped.

It has been found with an implement of the described construction that corn stalks and other field trash may become locked or entangled in the radial tines forming the rotary hoe. As the implement is drawn through a field, adjacent hoes then tend to become locked into position and the implement loses its usefulness. The present invention contemplates a construction which overcomes this disadvantage.

SUMMARY OF THE INVENTION

Briefly, the present invention comprises an implement which includes a tool bar with a plurality of support arms projecting from the tool bar. The support arms are normally spring biased toward the earth or soil as the tool bar is drawn through a field. Attached to the end of each arm is a multitined, rotary hoe. Alternate hoe members are aligned along a common axis. The axis of rotation of adjacent hoe members is separated by a distance which is no greater than the diameter of a rotary hoe but at least 0.8 times the diameter of the rotary hoe. In this manner, the rotary hoes overlap partially and, as a result, the tines of the rotary hoes provide a self cleaning action.

Thus, it is an object of the present invention to provide an improved rotary hoe construction.

It is a further object of the present invention to provide a rotary hoe construction wherein a multitined rotary hoe element attached to a support arm is separated from its adjacent element in the direction of field travel by a specific distance which renders the rotary hoe mechanism self cleaning.

Still another object of the present invention is to provide a support arm construction for a rotary hoe which facilitates efficient operation of the implement.

These and other objects, advantages and features of the invention will be set forth in the detailed description which follows.

DESCRIPTION OF THE DRAWING

In the detailed description which follows, reference will be made to the drawing comprised of the following figures.

DESCRIPTION OF THE PREFERRED EMBODIMENT

Figure 1:
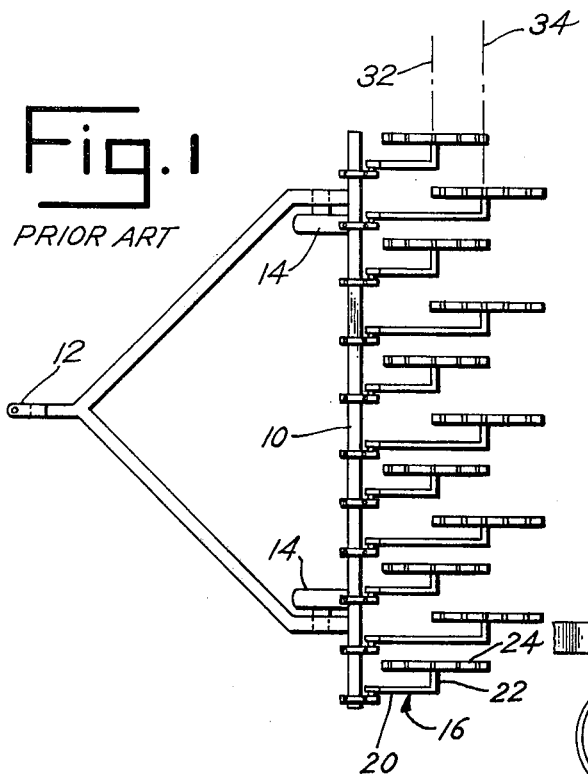
FIG. 1 is a top plan view of a typical prior art rotary hoe implement.
Figure 2:
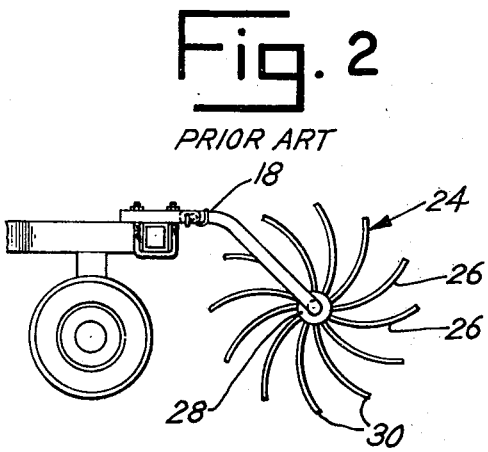
FIG. 2 is a side elevation of the rotary hoe of FIG. 1.

FIGS. 1 and 2 illustrate a known prior art rotary hoe farm implement. As shown in these figures, the implement includes a tool bar 10 which is mounted for transverse to the direction of normal field travel. The tool bar is attached to an appropriate hitch 12 for transport by a prime mover. Running gear or wheels 14 may be raised or lowered into position for road travel or field use of the implement.

Projecting from and attached to the tool bar 10 are rotary hoe support arms 16. The support arms 16 are biased by springs 18 downwardly from the tool bar 10 toward the earth or soil. Each support arm 16 is thus pivotally mounted on the tool bar 10 and biased by springs 18. The support arms 16 are generally L-shaped with a first run 20 in the direction of field travel and a second run or axle 22 projecting laterally from the first run 20.

A rotary hoe 24 is pivotally mounted on each axle 22. Each rotary hoe 24 is fabricated from a plurality of tines 26 which extend radially from a hub 28 for an equal distance. Each tine 26 includes a pointed end 30 which is designed to till soil. Any desired number of tines 26 may be utilized for the rotary hoe implement. The shape and configuration and arrangement of the tines 26 is optional.

The rotary hoes 24 in combination with associated support arms 16 are arranged to form two separate rows of hoes 24 defined by a forward axis 32 and a rearward axis 34. Thus, the center of rotation of the rotary hoes 24 define the forward axis 32 and rearward axis 34. Alternate rotary hoes 24 lie on the forward axis or the rearward axis 34. The axes 32 and 34 are separated by a distance which is less than the radius of each rotary hoe. As a result of this construction, field trash such as corn stalks and the like become caught in the rotating tines as the implement is drawn through the field. With continued use, this trash will become locked into the tines and cause locking of adjacent hoe members 24.

Figure 3:
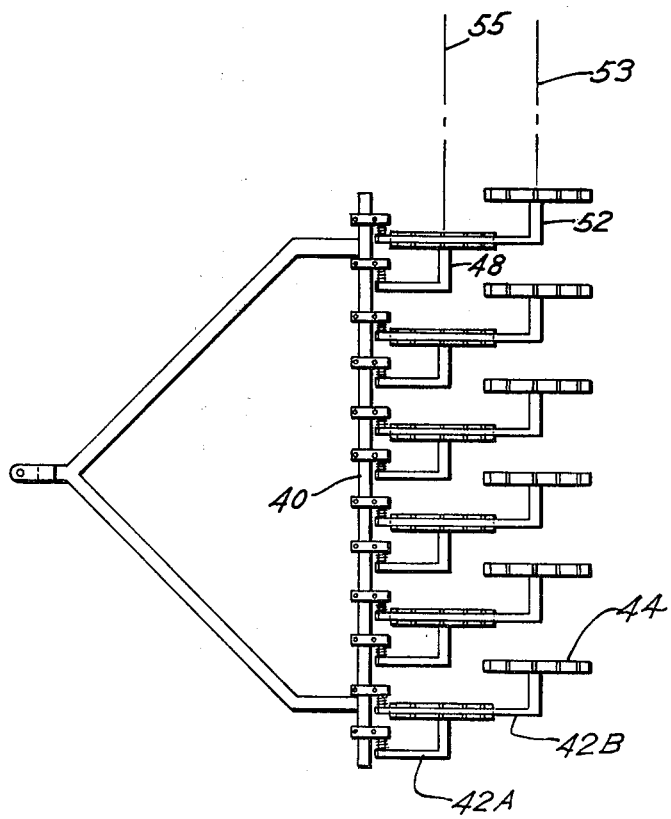
FIG. 3 is a top plan view of the improved rotary hoe of the present invention.
Figure 4:
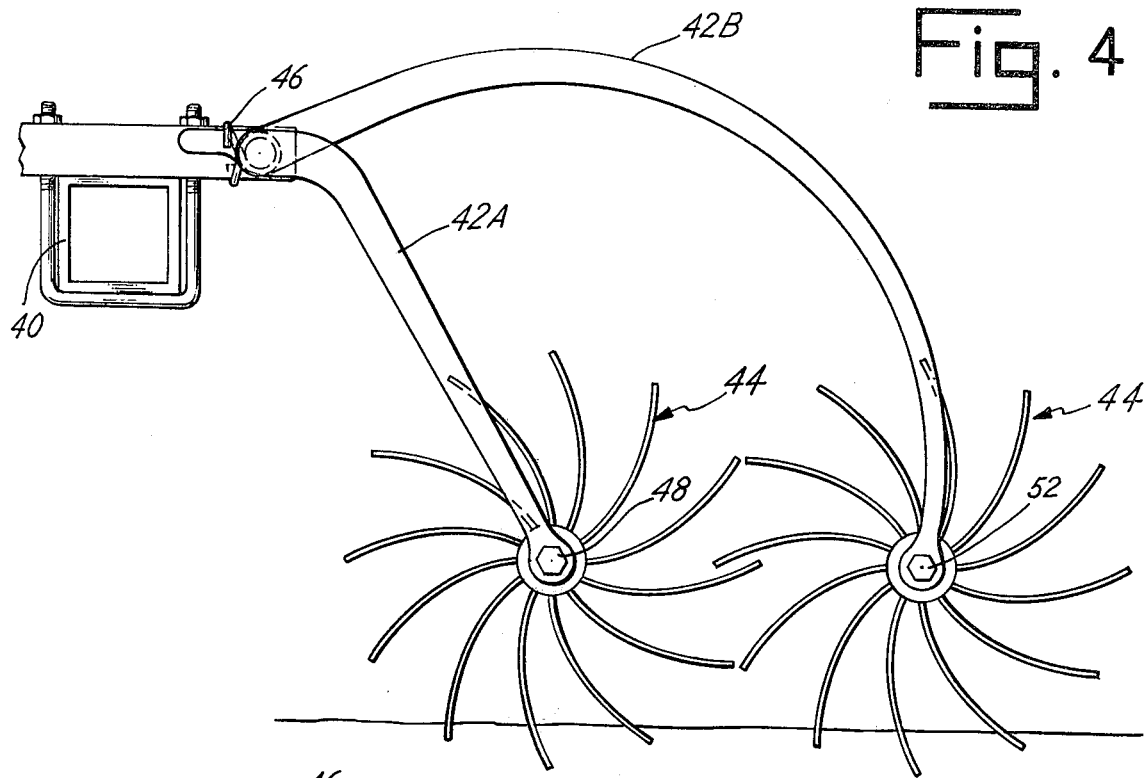
FIG. 4 is a side elevation of the improved rotary hoe of FIG. 3.
Figure 5:
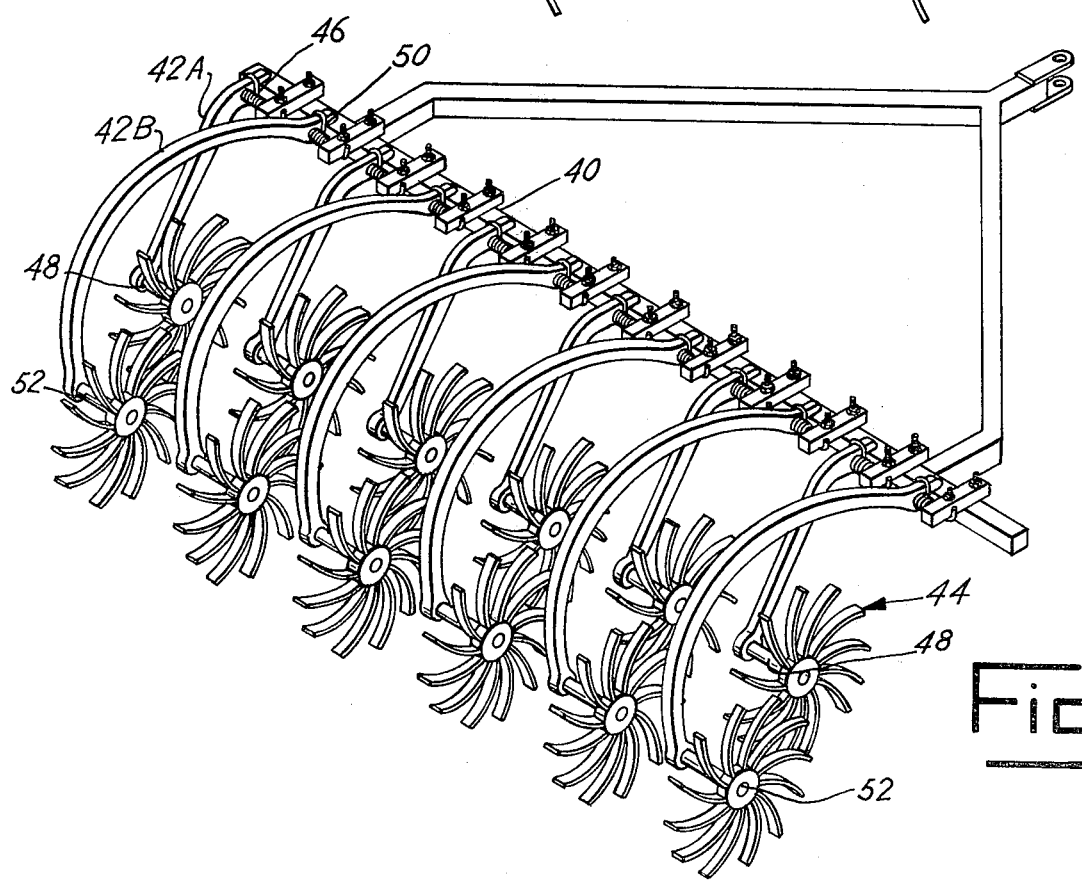
FIG. 5 is a perspective view of a typical implement incorporating the improved construction of the present invention.

FIGS. 3–5 illustrate the improved implement of the present invention which eliminates the problem of trash clogging the tines of a rotary hoe and rendering the implement ineffective. As shown in these figures, a tool bar 40 is utilized to mount a plurality of support arms 42. The support arms 42 have a special construction as compared to the prior art support arms. Each support arm has a rotary hoe 44 attached to its free or axle end. The rotary hoe 44 is of the same construction as the rotary hoe 24 in the prior art device. The tool bar 40 may also be of the same construction. Support arms 42 are, however, of a distinctly different construction and render the total combination of the elements different and improved with respect to the prior art device.

First, the support arms 42 are divided into two categories, a short support arm 42A and a longer support arm 42B. The shorter support arms 42A extend from the tool bar 40 and are biased by springs 46 downwardly toward the earth or soil. The rotary hoe 44 is attached to a projecting axle member 48 of the support arm 42A.

The longer support arms 42B are also pivotally attached to the tool bar 40 and are biased by springs 50 in the same direction as the support arms 42A. The longer support arms 42B are curved and aligned over a hoe 44 mounted on the adjacent tool arm 42A so that arm 42B overlies an adjacent rotary hoe 44 mounted on a short support arm 42A. Each rotary hoe 44 has a substantially identical radius and diameter. The curvature of the support arms 42B is such that the spacing between the outer periphery of the rotary hoe 44 over which it lies and the support arm 42B is at least 1.3 times the radius of the rotary hoe 44. It has been found that this provides sufficient clearance during all movement of the implement through the field despite any irregularities which might appear in the field.

The longer support arms 42B also terminate with an axle 52 which supports a rotary hoe 44. The support arms 42B and more particularly their axles 52 define a rotation axis 53 for rotary hoes. Another axis 55 is defined by the axle 48 associated with the short support arms 42A. These axes 53, 55 are offset from one another by a distance which is less than the diameter of the rotary hoes 44 but greater than 0.8 times the diameter of the rotary hoes 44. This spacing is critical in order to accomplish the objectives of the present invention.

Also, alternate rotary hoes 44 are arranged on the alternate forward or rearward axis. As a result, as will be appreciated by review of FIG. 4, the rotary hoes 44 rotate as they proceed to till the soil. Their tines overlap partially but not nearly to the extent that the prior art devices provided for overlapping of tines. As a result, any field trash or materials caught in the tines of adjacent rotary hoe members 44 will be cut or sheared and thus removed by the adjacent rotary hoes 44. In this manner, the rotary hoe 44 becomes a self-cleaning implement and will not clog as observed in the prior art implement. Also, since the support arm 42B overlies the forward rotary hoe 44, there is less opportunity for trash to become caught upon the arms 42A and 42B.

Though there has been set forth a preferred embodiment of the invention, it is to be understood that the invention is to be limited only by the following claims and their equivalents.

What is claimed is:

1. An improved rotary hoe implement, comprising, in combination:

a plurality of generally circular, multiple tined, rotary hoe members, each hoe member including a center pivot axis about which the member rotates as it moves through earth;

a tool bar and a support arm for each hoe member connected to the tool bar for mounting the hoe members with their pivot axis generally transverse to the direction of travel of the hoe members in the earth, alternate longer support arms being mounted over adjacent hoe members and positioned above the hoe members by a distance at least equal to or greater than 1.30, the radius of a hoe member, said support arms providing for the axis of mounting of adjacent hoe members being offset in the direction of the hoe member travel, said offset being less than the maximum diameter of the hoe members and greater than 0.8 times the diameter of the hoe member and defining means for partial overlap of the rotary path of adjacent hoe members to clean out field trash from the tines of adjacent hoe members.

* * * * *